Sept. 10, 1968   H. V. ROBERTS, JR., ET AL   3,400,637
FLUID PRESSURE POWER UNIT WITH MAGNETIC LATCHING MEANS
Filed Aug. 8, 1966
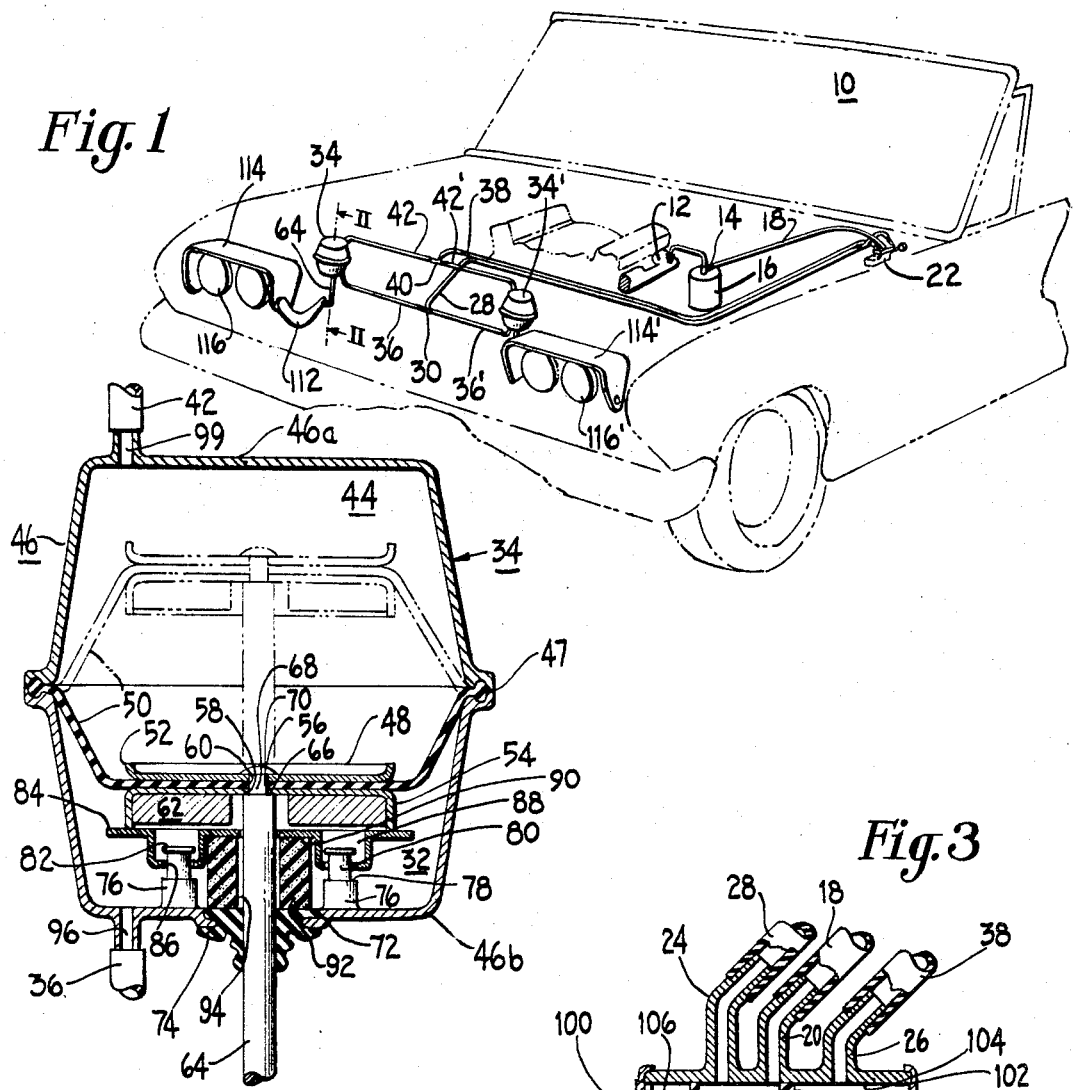
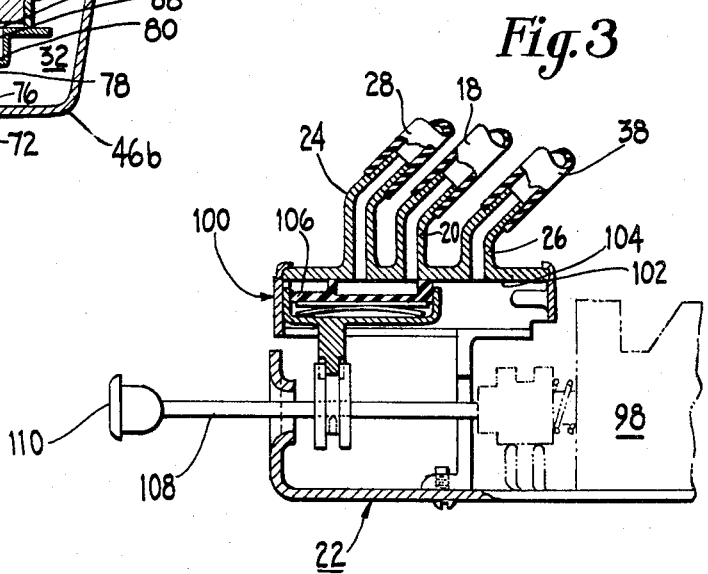
INVENTOR.
HOBART V. ROBERTS JR. and
JOSEPH J. ANDRYCHA
E. Herbert Liss
ATTORNEY.

United States Patent Office 3,400,637
Patented Sept. 10, 1968

3,400,637
FLUID PRESSURE POWER UNIT WITH MAGNETIC LATCHING MEANS
Hobart V. Roberts, Jr., Elma, and Joseph J. Andrycha, Buffalo, N.Y., assignors to Trico Products Corporation, Buffalo, N.Y.
Filed Aug. 8, 1966, Ser. No. 570,903
6 Claims. (Cl. 91—466)

ABSTRACT OF THE DISCLOSURE

A fluid system for controlling a fluid pressure power unit which actuates movable equipment as, for example, retractable headlights on a motor vehicle, includes fluid pressure source, control for directing fluid to one side of the other of a fluid operated power unit. The power unit includes a diaphragm which may be latched at one unit position by a self-aligning magnetic latch which includes a magnet mounted on the diaphragm and a hold-down unit disposed for self-aligning solid contact with the magnet mounted in opposition to the magnet for engagement with the magnet in the latching position.

---

The present invention relates to an improved power unit for operating movable auxiliary equipment in motor vehicles and, more particularly, to a pressure differential actuated power unit incorporating a fail-safe magnetic hold-down device.

Although the power unit is described and illustrated by way of example for use in a retractable headlamp shield system, it will of course be understood that in accordance with the broader aspects of the invention the power unit may be utilized to operate other and different auxiliary equipment. A pressure differential operated power unit may be utilized for moving auxiliary equipment between limit positions and it is normally essential when so utilized that the auxiliary equipment be absolutely maintained in one or the other of the limit positions—that usually being the operative position. Devices of this kind have been provided which utilize separate or integral mechanical latching elements which require additional control mechanism for operating the latching mechanism. The present invention utilizes a magnetic hold-down device internally integrated with the power unit. It furthermore provides for this use in systems where axial as well as canting movement of the operating shaft of the power unit occurs. The hold-down unit of this invention provides for positive retention in operative position regardless of the canting of the operating shaft and also provides for inherent alignment of the hold-down assembly.

The magnetic latch mechanism of this invention may employ a permanent magnet and an armature of steel or other suitable magnetic material having long term corrosion protection. Thus, the latch has a substantially unlimited functional life with no appreciable wear. Furthermore, since this permanent magnet latching mechanism is fully independent of external control mechanism, perpetual fail-safe operation is attained. The need for fluid conduits, electrical circuitry or mechanical linkage heretofore required to ensure maintenance of headlamp position is entirely eliminated. The structure is designed so that the elements are self-aligning to provide maximum holding force.

The magnetic hold-down, which in the instant example may be in the order of eight to ten pounds, assures rigid positioning of the headlamps or headlamp covers, but permits the force relied upon for moving these elements to readily overpower the holding force. This may be accomplished at the will of the operator when the equipment is operated by manual controls.

While shown here by way of example in its simplest form—that is to provide open position holding means—it is of course obvious that the magnetic latch may be utilized for holding the headlamp or headlamp covers rigid in both open and closed positions.

The principal object of the present invention is to provide an improved pressure differential actuated power unit with a simplified, internal positive holding mechanism to maintain the unit in one or more of its limit positions.

Another object of the invention is to provide an improved pressure differential actuated power unit for operating auxiliary equipment in automotive vehicles which includes a continuously acting fail-safe internal hold-down device for maintaining the equipment to be operated in one of its limit positions, the hold-down device being operative without use of external power.

A further and more specific object of the invention is to provide an improved pressure differential actuated power unit for actuating auxiliary equipment in automotive vehicles between limit positions incorporating an internal hold-down device which is a continuously acting, self-aligning magnetic structure.

Other objects and advantages of the invention will be apparent from the following detailed description taken in connection with the accompanying drawings in which:

FIG. 1 is a schematic view of the invention embodied in a retractable headlamp shield system of a motor vehicle;

FIG. 2 is a sectional view taken on line II—II of FIG. 1; and

FIG. 3 is a sectional view of a manual control which may be used with the invention.

Briefly, the invention comprises a housing which encloses a flexible diaphragm assembly forming adjacent expansible chambers within the housing. Each chamber is provided with porting means to apply vacuum to one of the chambers while venting the other of the chambers or vice versa. As illustrated, the diaphragm includes a dished plate member carrying an operating shaft secured to the diaphragm for movement therewith. The dished member has nestled therein a magnet. A plurality of shouldered posts are secured to one end wall of the power unit. These posts extend through circumferentially spaced apertures in a plate of magnetic material. The shoulder forms one limit position for axial movement of the plate and a radially flanged end on the post defines the other limit of axial movement. The apertures in the plate are of such size as to provide sufficient clearance for canting movement as well as axial movement of the plate on the posts. The magnetic plate is further supported centrally thereof by a cushioned block disposed intermediate the adjacent end wall of the power unit housing and the central portion of the plate. The cushioned block may be of rubber or other suitable resilient material and may be centrally apertured to receive the operating shaft therethrough with substantial clearance. A manual control may be provided which admits vacuum to one chamber of the power unit while venting the other chamber. The magnetic plate and the magnet secured to the diaphragm cooperate to form latching structure which maintains the diaphragm and the operating shaft in one of its limit positions. When in such position, sufficient vacuum must be applied to overcome the attractive force between the magnet and the magnetic plate to move the diaphgram and the operating shaft toward the other limit position.

In FIG. 1 the power unit is shown embodied in a motor vehicle 10 having the usual manifold 12 serving as a vacuum source. The manifold 12 is connected through a check valve 14 to a vacuum storage tank 16 in such a manner as to apply vacuum to the power units 34 and 34' through the manual control 22 directly from the manifold 12 when the manifold vacuum exceeds the vacuum pressure in the storage tank 16 and from the storage tank 16 when the storage tank vacuum exceeds the manifold vacuum. The supply line 18 from the storage tank 16 is connected to the inlet port 20 of a manual control 22. The manual control includes, in addition to inlet port 20, a pair of outlet ports 24 and 26. Valving is provided so that one of ports 24 and 26 may be selectively placed in communication with the inlet port 20 while the other is vented to the atmosphere. The port 24 is connected through a conduit 28 and a T connector 30 to chambers 32 of a pair of power units 34 and 34' through conduit 36 and 36', respectively. The outlet port 26 is connected through a conduit 38, a T 40 and conduits 42 and 42' to chambers 44 of the power units 34 and 34', respectively.

Since power units 34 and 34' as illustrated are identical, only one will be described. Power unit 34 comprises a housing 46 formed of housing halves 46a and 46b. The housing halves 46a and 46b may be secured together as at junction 47 in any suitable manner as, for example, welding or crimping. A diaphragm assembly 48 including a flexible diaphragm 50 is provided. The flexible diaphragm 50 may have its periphery crimped or secured in any suitable manner at the junction 47 of housing halves 46a and 46b to form a pair of adjacent expansible chambers 32 and 44.

The diaphragm assembly 48 includes the flexible diaphragm 50 and a pair of dished plates 52 and 54 disposed centrally on opposite sides of the diaphragm 50 in back to back relationship. The plates are provided with aligned central apertures 56 and 58 in alignment with a central aperture 60 of the flexible diaphragm 50. The plates 52 and 54 may be of any suitable rigid material, preferably metal. A centrally apertured magnet 62 is nestled within the dished plate 54 and may be secured in position by adhesive securement to the dished plate as shown or in any other suitable or desirable manner. The depth of the side walls of the dished plate 54 may slightly exceed the thickness of the magnet 62 to provide clearance and a small air gap. The operating shaft 64 is shouldered adjacent its end, as at 66, and has a reduced end portion 68 which is received snugly through the aligned apertures 56, 58 and 60 of the plates. The end of the operating shaft 64 is staked over as at 70 to retain the operating rod in assembled condition with the diaphragm assembly 48.

The shaft 64, therefore, is movable together with the diaphragm assembly 48. The shaft 64 extends through expansible chamber 32 and outwardly therefrom through a central aperture in the end wall of the housing half 46b. The central aperture 72 has disposed therein a grommet 74 which sealingly engages the shaft 64 to maintain compartment 32 airtight.

Surrounding the aperture 74 and secured to the end wall of the housing half 46b are a plurality of circumferentially spaced supporting posts 76. These posts are shouldered, as at 78, and have a reduced end portion 80 and a radially flanged end 82. A plate 84 of magnetic material such as steel has circumferentially spaced apertures 86 which receive reduced end portion 80 of the shouldered posts 76 with sufficient clearance to permit canting of the plate 84. The flange 82 and the shoulder 78 of the post 76 provide stops for limiting the axial movement of the plate 84. The plate 84 includes an annular recess 88 disposed intermediate its outer periphery and its center to accommodate the projection of the post 76 through the plate 84. As can be seen best in FIG. 2, the annular recess 88 in plate 84 forms a central recess 90 on the underside of plate 84. A cushioned block 92 of suitable resilient material is disposed within the recess 90 intermediate the plate 84 and the end wall of the housing half 46b. The block 92 may be of any suitable or desirable elastomeric material as, for example, rubber or neoprene, and forms a cushioned support for the plate 84. This cushioned support 92 dampens and absorbs the shock occasioned by the magnetic engagement of the diaphragm assembly 48 with the plate 84. The block 92 is centrally apertured in alignment with the aperture in the grommet 74 to receive the shaft. The aperture 94 in the block 92 provides sufficient clearance to permit the shaft to cant during operation. The mounting of the plate 84 hereinabove described permits the plate 84 to cant so that the diaphragm assembly 48 and the plate 84 make solid contact during magnetic engagement. Each of the chambers 32 and 34 include nippled ports 96 and 98, respectively, to which are attached conduits 36 and 42, respectively.

In FIG. 3 there is illustrated by way of example one type of manual control which may be employed to effect communication between a source of fluid pressure and one or the other of the power unit chambers 32 or 44. The manual control 22' comprises an electric switch section 98 and a fluid pressure section 100. Since the power unit of the present invention is embodied by way of example in a system for operating retractable headlamp shields, an electric section of the manual control 22' is utilized to switch on the headlights and to actuate the retractable shields simultaneously. The fluid pressure section 100 of the switch 22 includes a valve body 102 having a valve seat 104 with ports 20, 24 and 26 opening in the valve seat 104. A slide valve assembly 106 is movable on a valve seat 104 to effect communication between port 20 and port 26 while venting port 24 or, alternatively, to effect communication between port 20 and port 24 while venting port 26. A manually operated shaft 108 having a push button 110 is operatively connected both to the electric switch contacts of section 98 and the slide valve 106 so that both are operated simultaneously by axial movement of the shaft 108 when the button 110 is either pulled or depressed. In the example illustrated, the operating shafts 64 of the power units 34 and 34' are connected through levers 112 to retractable headlight shields 114 and 114' for movement from a position in which each shield covers one of the headlamp sets 116 and 116' to a retracted position, exposing the headlamp sets 116 and 116'.

In operation, when the button 110 is pulled to move the operating shaft 108 to the position shown in FIG. 3, the contacts in light switch 98 are closed to effect lighting of the lamps. Simultaneously, the valve assembly 106 is moved to the position seen in FIG. 3 and vacuum flows from the manifold 12 or the storage tank 16, as the case may be, through conduit 18, port 20, valve assembly 106, port 24, conduit 28, T 30 and conduits 36 and 36' through ports 94 to chambers 32 of the power units 34 and 34'. This draws the diaphragm assembly 48, together with shaft 64, downwardly to the full line position seen in FIG. 2, thereby moving the levers 112 clockwise to effect clockwise movement of the headlamp shields 114 and 114' to the open position as seen in FIG. 1. As the diaphragm assembly approaches the plate 84, the magnet 62 and the plate 84 attract to effectively latch the headlamp shields 114 and 114' in open position.

When the button 110 is depressed, thereby depressing shaft 108 of manual control 22, the contacts of headlight switch 98 are opened to turn off the headlights. At the same time, valve assembly 106 is moved to a position to effect communication between ports 20 and 26 while venting port 24'. The chamber 32 of the power unit 34 then vents through port 96, conduits 36 and 36', T 30, conduit 28 and port 24. Vacuum is supplied from either the manifold 12 or the storage tank 16 to the chambers 44 of the power units 34 and 34' through conduit 18, port 20, valve assembly 106, port 26, conduit 38, T 40, conduits 42 and 42' to ports 99. This causes the diaphragm assembly 48 to move to the position shown in dotted lines in FIG. 2, thereby moving the operating shaft 64 of the power unit 34 causing counterclockwise motion of link 112 and headlamp shield 114, thereby covering headlight set 116.

Although a certain specific embodiment of the invention has been shown and described for the purpose of illustration for use in a specific retractable shield headlamp system, it will of course be apparent that in accordance with the broader aspects of the invention, the novel power unit may be utilized in other and different retractable headlamp shield systems as well as retractable headlamp sets or for other and different movable auxiliary equipment in automotive vehicles. It will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A fluid pressure power unit comprising a housing enclosing a flexible diaphragm assembly movable in response to differential fluid pressure on opposite sides thereof between limit positions forming adjacent expansible chambers within the housing, fluid pressure porting in communication with said housing, said housing having an aperture at an end, a shaft coupled to said diaphragm assembly for movement therewith, said shaft extending through said aperture, a yieldably mounted, self-aligning magnetic hold-down means disposed on said housing adjacent one of said limit positions, a magnetic unit mounted on at least one side of said diaphragm assembly in attractive opposition to said magnetic hold-down means, whereby said diaphragm is magnetically restrained in one of its limit positions.

2. The combination according to claim 1 wherein said hold-down means comprises an element of magnetic material, a block of resilient material for yieldingly supporting said element disposed intermediate said element and an end wall of said housing to permit tilting of said element into alignment for solid contact with said magnetic unit.

3. The combination of claim 1 including retainer means for limiting the movement of said element of magnetic material.

4. The combination according to claim 3 wherein said retainer means comprises one or more posts secured to said end wall having opposed shoulders thereon, said element of magnetic material being a plate having apertures therein received on said posts between said opposed shoulders, said opposed shoulders being of greater radial dimensions than said apertures whereby said shoulders limit the movement of said plate.

5. The combination according to claim 4 wherein said diaphragm assembly includes an axially extending anular flange extending outwardly from the diaphragm assembly a greater distance than said magnet whereby said flange serves to space said magnet from said plate when said flanges engage said plate.

6. A fluid pressure power unit comprising a housing enclosing a flexible diaphragm assembly movable between limit positions in response to selective application of fluid pressure, a shaft operatively connected to said diaphragm assembly for movement therewith, said shaft extending outwardly of said housing, a magnetic latching assembly comprising a first magnetic element means mounted for movement with said diaphragm and a second magnetic element means mounted adjacent a limit position of said diaphragm, said first and second magnetic element means being in attractive opposition, one of said magnetic element means being mounted for universal canting movement to permit tilting into alignment for solid contact with the other of said magnetic element means.

References Cited
UNITED STATES PATENTS

| | | | |
|---|---|---|---|
| 2,134,072 | 10/1938 | Christensen | 92—99 |
| 2,627,846 | 2/1953 | Boedeker | 92—15 |
| 2,983,922 | 5/1961 | Juilfs | 1—44.4 |
| 3,125,003 | 3/1964 | Hoekstra | 92—96 |
| 3,143,043 | 8/1964 | Kinney | 92—100 |
| 3,180,235 | 4/1965 | Schmitz | 92—98 |
| 3,205,787 | 9/1965 | Volkmann | 91—399 |

FOREIGN PATENTS 873,209  4/1953  Germany.

MARTIN P. SCHWADRON, *Primary Examiner.*

B. L. ADAMS, *Assistant Examiner.*